United States Patent
Kapil

(10) Patent No.: US 8,166,316 B2
(45) Date of Patent: Apr. 24, 2012

(54) SINGLE INTERFACE ACCESS TO MULTIPLE BANDWIDTH AND POWER MEMORY ZONES

(75) Inventor: Sanjiv Kapil, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 911 days.

(21) Appl. No.: 12/163,095

(22) Filed: Jun. 27, 2008

(65) Prior Publication Data

US 2009/0327794 A1    Dec. 31, 2009

(51) Int. Cl.
- G06F 12/10    (2006.01)
- G06F 1/32     (2006.01)
- G06F 1/14     (2006.01)
- G06F 12/02    (2006.01)
- G06F 9/50     (2006.01)

(52) U.S. Cl. ........ 713/300; 713/310; 713/320; 713/321; 713/322; 713/323; 713/324; 713/600; 710/9; 718/102; 718/104; 711/5; 711/154

(58) Field of Classification Search .......... 713/300, 713/310, 320–324, 330, 340, 400–401, 500–503, 713/600–601; 711/5, 154, 173, E12.001; 710/8, 9, 10; 718/100–108

See application file for complete search history.

(56) References Cited

U.S. PATENT DOCUMENTS

| | | | | |
|---|---|---|---|---|
| 6,941,437 | B2 * | 9/2005 | Cook et al. | 711/173 |
| 7,484,065 | B2 * | 1/2009 | Pomaranski et al. | 711/170 |
| 2005/0044440 | A1 * | 2/2005 | Barr et al. | 713/500 |
| 2008/0016308 | A1 * | 1/2008 | Bartley et al. | 711/167 |
| 2008/0082779 | A1 * | 4/2008 | Ogasawara et al. | 711/170 |
| 2009/0006781 | A1 * | 1/2009 | Bartley et al. | 711/154 |
| 2009/0150710 | A1 * | 6/2009 | Bilger et al. | 713/600 |

OTHER PUBLICATIONS

Micron, Technical Note, "FBDIMM—Channel Utilization (Bandwidth and Power)," 2006 Micron Technology, Inc. pp. 1-22.
Micron, Technical Note, "Calculating Memory System Power for DDR2," 2005 Micron Technology, Inc. pp. 1-26.

* cited by examiner

Primary Examiner — Kim Huynh
Assistant Examiner — Fahmida Rahman
(74) Attorney, Agent, or Firm — Lawrence J. Merkel; Meyertons, Hood, Kivlin, Kowert & Goetzel, P.C.

(57) ABSTRACT

In an embodiment, a system comprises a first memory module interface unit (MMIU) configured to couple to a first one or more memory modules, and a second MMIU configured to couple to a second one or more memory modules. The first MMIU is configured to operate the first one or more memory modules at a first frequency and the second MMIU is configured to concurrently operate the second one or more memory modules at a second operating frequency different from the first operating frequency.

12 Claims, 6 Drawing Sheets

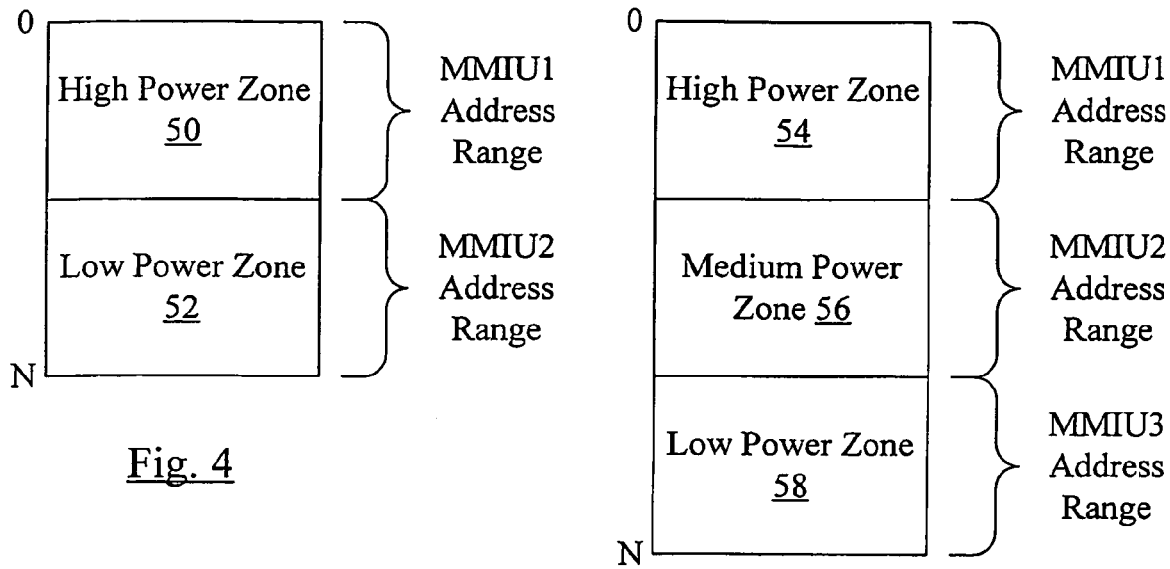
Fig. 4
Fig. 5
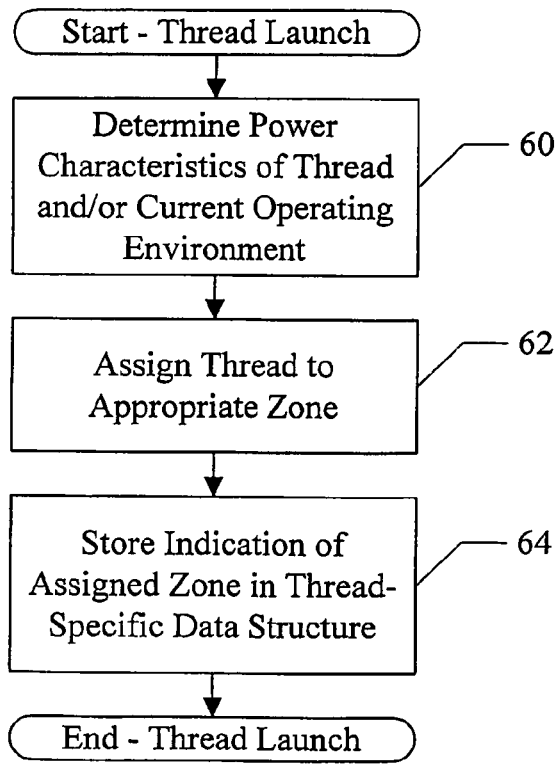
Fig. 6

Computer Accessible Storage Medium 200

O/S 100

Fig. 8

SINGLE INTERFACE ACCESS TO MULTIPLE BANDWIDTH AND POWER MEMORY ZONES

BACKGROUND

1. Field of the Invention

This invention is related to memory systems for computer systems, and specifically to power and performance in memory systems.

2. Description of the Related Art

Reducing the power consumed by computer systems of various types has quickly becoming a focus for computer system manufacturers. For example, mobile devices such as laptops, cell phones, personal digital assistants (PDAs), etc. are common and battery life can be extended by reducing the power consumption. Server-class computers are frequently deployed in rack mounts and other configurations which place the computers in close proximity to each other and other devices. Because the heat (a function of the power consumed) is challenging to dissipate in such configurations, the power consumed in the computer is a concern for these computers as well.

In the past, the focus has been on reducing the power consumed by processors in the computer systems. However, as the size of the main memory system has grown and the clock frequency of the synchronous dynamic random access memories (SDRAMs) used to populate the main memory system has increased, the power consumed in the main memory system has become a larger factor in overall system power consumption.

SUMMARY

In an embodiment, a system comprises a first memory module interface unit (MMIU) configured to couple to a first one or more memory modules, and a second MMIU configured to couple to a second one or more memory modules. The first MMIU is configured to operate the first one or more memory modules at a first frequency and the second MMIU is configured to concurrently operate the second one or more memory modules at a second operating frequency different from the first operating frequency.

In an embodiment, a method comprises: determining one or more characteristics of a thread that is being launched for execution in a computer system that includes a memory system having an address space partitioned into at least two zones, each zone mapped to one or more memory modules, wherein the one or more memory modules to which a given zone is mapped have different power/performance characteristics during use than the one or more memory modules to which other zones are mapped; and assigning the thread to one of the zones based on the one or more characteristics.

BRIEF DESCRIPTION OF THE DRAWINGS

The following detailed description makes reference to the accompanying drawings, which are now briefly described.

FIG. 4 is a block diagram illustrating one embodiment of a memory address space including power zones.

FIG. 5 is a block diagram illustrating another embodiment of a memory address space including power zones.

FIG. 6 is a flowchart illustrating operation of one embodiment of an operating system at a thread launch.

FIG. 8 is a block diagram of one embodiment of a computer accessible storage medium.

Figure 1:
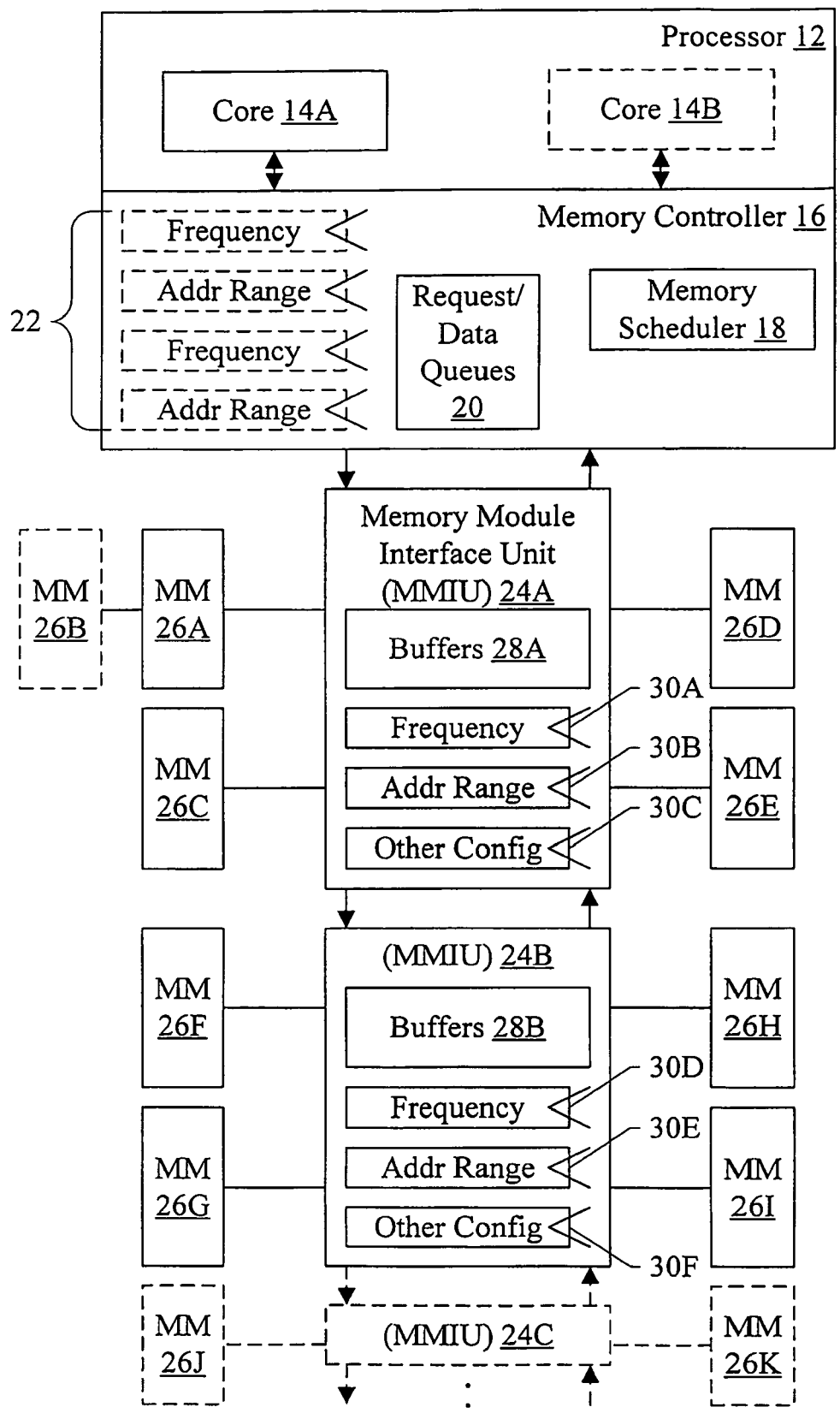
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a computer system 10 is shown. In the embodiment of FIG. 1, the computer system 10 comprises a processor 12 that comprises at least one processor core 14A and optionally may include additional processor cores such as optional processor core 14B, in some embodiments. The processor 12 further includes a memory controller 16 that may include a memory scheduler 18, request/data queues 20, and may optionally include configuration registers 22, in some embodiments. In one embodiment, the processor 12 may comprise an integrated circuit integrating the memory controller 16 and the processor cores 14A-14B.

The system 10 further comprises two or more memory module interface units (MMIUs) 24A-24C. Each MMIU 24A-24C is coupled to one or memory modules (MMs), such as the memory modules 26A-26K. For example, the MMIU 24A is coupled to the memory modules 26A-26E in FIG. 1; the MMIU 24B is coupled to the memory modules 26F-26I in FIG. 1; and the optional MMIU 24C is coupled to the optional memory modules 26J-26K in FIG. 1. The number of MMIUs, and the number of memory modules coupled to a given MMIU, may vary in other embodiments. Different MMIUs in the same system may have different numbers of memory modules coupled to them, and the memory modules may have different capacities. The MMIUs, in the illustrated embodiment, are coupled in cascade fashion to the memory controller 16 (also referred to as a daisy chain connection, in some cases). That is, the MMIU 24A is coupled to the memory controller 16 and the MMIU 24B. The MMIU 24B is further coupled to the optional MMIU 24C, etc.

In the illustrated embodiment, the MMIU 24A and the MMIU 24B are illustrated in greater detail. Specifically, the MMIU 24A comprises buffers 28A, frequency configuration register 30A, address range configuration register 30B, and other configuration register 30C. Each register 30A-30C may represent one or more registers, in various embodiments. Similarly, the MMIU 24B comprises buffers 28B, frequency configuration register 30D, address range configuration register 30E, and other configuration register 30F. The buffers 28A-28B may provide temporary storage for data being transferred to and from the memory modules.

Each MMIU 24A-24C comprises circuitry to communicate with the memory modules 26A-26K to which that MMIU 24A-24C is coupled. The circuitry may drive and receive signals on the interfaces to the memory modules according to the definition of the interface. For example, in one embodiment, the memory modules may comprise fully buffered dual inline memory modules (FBDIMMs), and the interface may be the FBDIMM interface. Other embodiments may implement other memory standards. Generally, a memory module may comprise one or more memory devices (e.g. DRAM devices such as SDRAMs and more particularly double data rate (DDR) SDRAMs, DDR2 SDRAMs, or DDR3 SDRAMs). The memory module further comprises a substrate (e.g. a printed circuit board) to which the memory devices are connected. The substrate is dimensioned for insertion into a standard memory module connector. The memory module connector provides electrical and mechanical connection to a printed circuit board to which the MMIUs 24A-24C and possibly other components of the system (e.g. the processor 12) are connected (e.g. a "motherboard" or "CPU board"). Each memory module interface from a given MMIU 24A-24C may support at least one memory module, and in some embodiments more than one memory module can be connected to the same interface (e.g. memory modules 26A-26B in FIG. 1). Two or more memory module interfaces can be ganged together, in which the same address is provided concurrently on each memory module interface and the data provided on each memory module interface is concatenated or interleaved to provide the requested data. Effectively, ganging two interfaces may double the data width for a memory access. In other embodiments, data may be interleaved one two or more memory module interfaces to more rapidly transfer a block of data (e.g. a cache line of data).

Each MMIU 24A-24C may be programmed (e.g. via the frequency registers 30A and 30D in FIG. 1) to operate the memory modules coupled to that MMIU 24A-24C at a different frequency. That is, the interfaces to the memory modules include a clock signal or signals, and the frequency of the clock is programmed differently for each MMIU 24A-24C. The higher the frequency, the lower the latency for reads and writes to the memory modules and the higher the power consumption in the memory modules. In this fashion, the memory addresses that are mapped to the memory modules coupled to a given MMIU may form a zone in the memory address space that has particular power/performance characteristics. By allocating pages for threads executing on the processor 12 to specific zones, the power consumed (and performance achieved) during execution of the thread may be controlled. Accordingly, per thread (or per application) power consumption and performance may be controlled. For example, applications which are not significantly affected by slower memory accesses may use lower power zones, and applications which are more affected may use higher power zones. In another example, applications which have a higher priority may be assigned to higher power zones while low priority applications may be assigned to lower power zones. Similar controls may be implemented at a thread level for applications comprising multiple threads. Generally, a thread may comprise an independently schedulable (e.g. from an operating system point of view) sequence of instructions. Threads may generally execute in parallel, with software synchronization constructs such as semaphores used to control any interaction between threads, if any.

In some embodiments, the memory modules 26A-26K may all be members of the same memory technology family. A technology family may share the same interface definition, programming model, and electrical specifications. Members of the technology family may be operable at a plurality of frequencies that are specified as part of the family definition. Examples of technology families include DDR, DDR2, and DDR3. Members of the DDR3 family, for example, may be operable at data rates of 800, 1066, 1333, and 1600 Megabits per second (based on a clock frequency of 400, 533, 666, and 800 MHz and double data rate data transfers). In embodiments in which the memory modules are all members of the same technology family, different MMIUs 24A-24C may be programmed to operate their memory modules at different clock frequencies supported by that technology family. The power/performance selections between MMIUs may be completely dynamic, in some embodiments.

In other embodiments, a system 10 may include memory modules from different technology families coupled to different MMIUs 24A-24C. For example, the memory modules coupled to the MMIU 24A may be members of one technology family and the memory modules coupled to the MMIU 24B may be members of another technology family. The power/performance differences between zones may have a static component in such embodiments, since the differences between the technology families are static. However, power/performance selections still have a dynamic component by selecting the frequencies of operation. Such embodiments may permit cost savings in the system 10, however, since an older technology family tends to be less expensive for the same amount of memory storage than a more recently-developed technology family.

In one embodiment, the frequency registers 30A and 30D are programmable with indications of the frequencies at which the memory modules can be operated (and the technology family, if more than one family is supported). The indication may be represented in any desired fashion. For example, the indication may be encoded into the smallest number of bits that can represent the number of choices, or may be decoded as a one hot vector. In other embodiments, frequency selection may be performed in other ways. For example, pins or signals input to the MMIUs may be used to indicate the selected frequency, or the frequency may be fixed by design (e.g. based on the physical location in the cascade, etc.).

In the illustrated embodiment, as mentioned previously, the MMIUs 24A-24C are coupled in a cascaded fashion. Accordingly, any memory access having an address mapped to any memory module coupled to any of the MMIUs 24A-24C is issued by the memory controller 16 on the interface to the MMIU 24A. In some embodiments, the memory controller 16 may not have any information about which addresses are mapped to which MMIUs. The MMIU 24A may be programmable (in the address range register 30B) with an indication of the address range that is mapped to the memory modules 26A-26E coupled to the MMIU 24A. If the address is mapped to the memory modules 26A-26E, the MMIU 24A may accept the memory access and may perform the access to the memory modules. If the address is not mapped to the memory modules 26A-26E, the MMIU 24A may forward the memory access on the interface to the MMIU 24B. In similar fashion, the MMIU 24B may accept the memory access or forward the memory access, based on the address of the memory access and the address ranged indicated in the address range register 30E.

Accordingly, the interface between the MMIU 24A and the memory controller 16, the interface between the MMIU 24A and MMIU 24B, the interface between the MMIU 24B and the MMIU 24C, etc. may all be part of a same interface and may be operated at a same frequency. The frequency of the interface may or may not be related to the frequencies of the interfaces to the memory modules. In the illustrate embodiment, the interface may comprise unidirectional point to point links between MMIUs and between the MMIU 24A and the memory controller 16. The memory controller 16 may transmit memory access commands and memory write data on the links flowing downward as illustrated in FIG. 1, and memory read data may be returned by the MMIUs on links flowing upward in FIG. 1.

The memory scheduler 18 may be configured to schedule memory accesses for transmission to the MMIUs 24A-24C. The memory accesses may be queued in the request/data queues 20, and may be sourced from the processor cores 14A-14B. In some embodiments, the processor 12 may be coupled to various peripheral (or input/output (I/O) devices), and memory accesses may also be sourced from these devices (e.g. direct memory access (DMA) accesses).

The memory scheduler 18 may schedule the memory accesses in part based on the latencies for data returning on the interface, for read accesses. That is, when a given read command is transmitted, one or more transmissions on the return link from the MMIU 24A will occur at a later point in time based on the memory latency. Thus, another read command may be not be scheduled until there is bandwidth available on the return link. For example, if all memory is the same latency, then another read command may not be scheduled until a number of clock cycles equal to the number of read data transfers has elapsed. If 4 read data transfers on performed on the return link, then a read command may not be scheduled for another 4 clock cycles.

Because the MMIUs 24A-24C are expected to be programmed to different frequencies of operation, the memory latencies for accesses handled by the different MMIUs are different. In one embodiment, the memory scheduler 18 may implement a fixed latency scheduling algorithm. The fixed latency may be at least as large as the highest latency from any of the MMIUs 24A-24C. Such a scheme may permit a relatively simple scheduler implementation, in which any read access that is scheduled causes a delay to the next read access of N clock cycles, where N is the number of data transfers on the return link that occur for a read access. For MMIUs 24A-24C that are operating their memory modules at higher frequencies (and thus lower latencies are possible), the buffers 28A-28B may be used to store the data until the fixed latency expires and the data is to be transmitted. While such a scheduler may be simpler, some performance may be lost (although the memory system is still power optimized).

Figure 2:
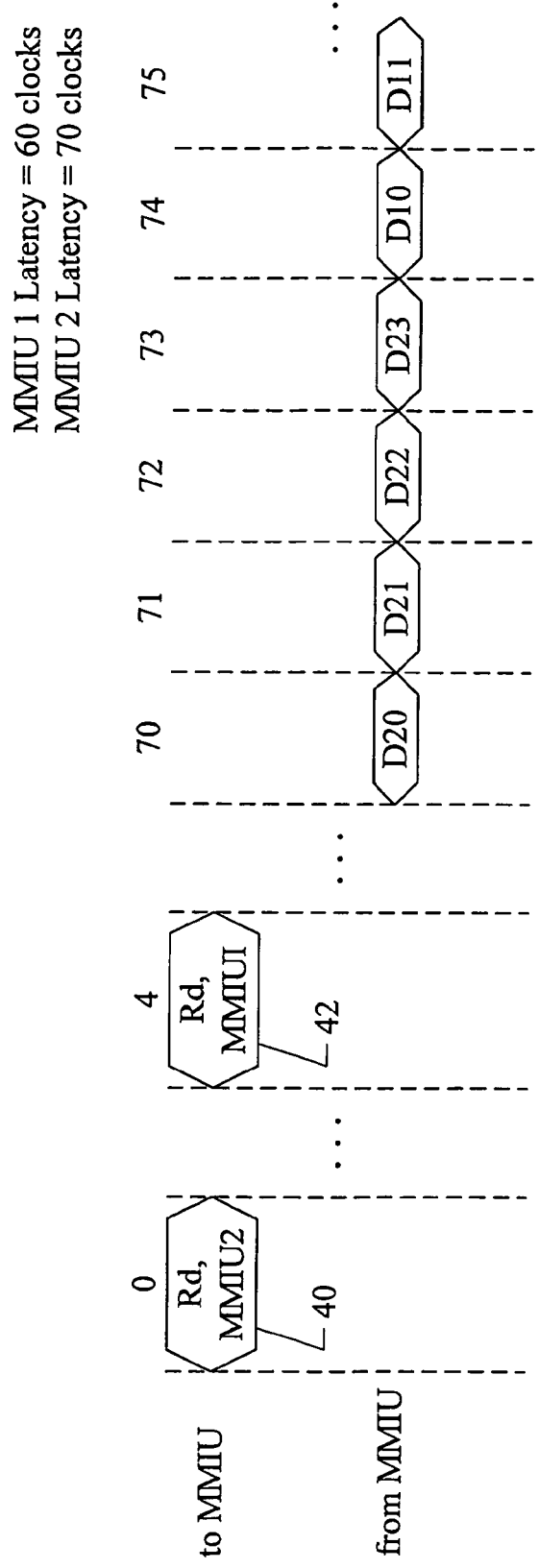
FIG. 2 is a timing diagram illustrating memory accesses in one embodiment of the system shown in FIG. 1.

FIG. 2 is a timing diagram illustrating fixed latency scheduling. Clock cycles (of the clock for the link between MMIUs and the memory controller) are delimited by vertical dashed lines in FIG. 2, and are numbered at the top. Ellipses are used to indicate that clock cycles have been omitted for convenience in the drawing. The MMIU 1 (e.g. MMIU 24A) latency is 60 clocks in this example, and the MMIU 2 (e.g. MMIU 24B) latency is 70 clocks in this example. That is, MMIU 1 is operating its memory modules at a higher frequency than MMIU 2 is operating its memory modules. The fixed latency for scheduling purposes is 70 clocks in this example, and the number of data transfers per read is 4 in this example.

The memory controller 16 schedules a read to memory mapped to MMIU 2 in clock cycle 0 (reference numeral 40). Accordingly, data is returned in clock cycles 70 to 73 (labeled D20 to D23). The next available window for transfer begins at clock 74. Accordingly, the memory controller 16 does not schedule another read until clock cycle 4 (reference numeral 42), and data is returned in clock cycles 74 to 78 (although only clock cycles 74 and 74, with D10 and D11, are shown in FIG. 2). Given the memory latency for MMIU 1 is 60 clock cycles, the data is actually available in the MMIU 1 data buffers at clock cycle 64. The data is held there until clock cycle 74, when the data can be transmitted according to the fixed latency scheduling.

In fixed latency scheduler embodiments, the memory controller 16 need not be aware of which addresses map to which MMIUs 24A-24C (more particularly, which addresses map to the memory modules coupled to the specified MMIU 24A-24C). Other embodiments may implement variable latency scheduling in the memory scheduler 18. In such embodiments, the memory scheduler 18 may use the frequency registers and address range registers 22 to determine the latency of a given memory access (based on which MMIU 24A-24C will handle the access). Accordingly, the memory scheduler 18 may track each memory access latency individually, and may schedule a read access if bandwidth is available at the time that the memory latency associated with that access would expire.

Figure 3:
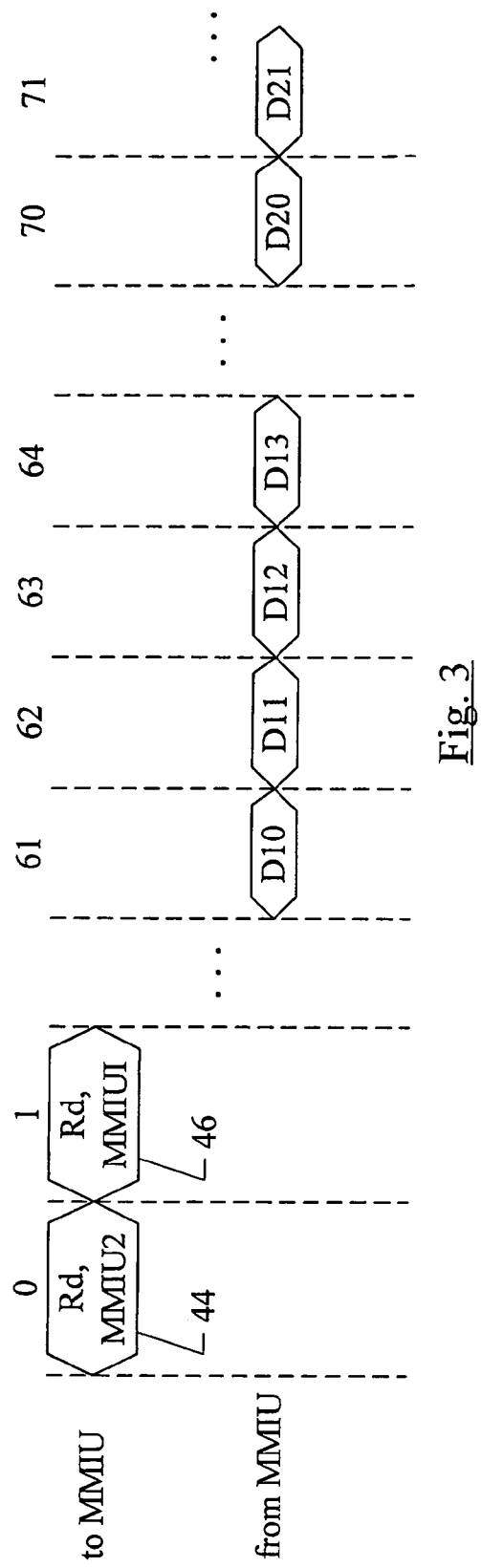
FIG. 3 is a timing diagram illustrating memory accesses in another embodiment of the system shown in FIG. 1.

For example, FIG. 3 is a timing diagram illustrating variable latency scheduling. Clock cycles (of the clock for the link between MMIUs and the memory controller) are delimited by vertical dashed lines in FIG. 3, and are numbered at the top, similar to FIG. 2. Ellipses are used to indicate were clock cycles have been omitted for convenience in the drawing. Similar to FIG. 2, the MMIU 1 (e.g. MMIU 24A) latency is 60 clocks in this example, and the MMIU 2 (e.g. MMIU 24B) latency is 70 clocks in this example. The number of data transfers per read is 4 in this example.

The memory controller 16 schedules a read to memory mapped to MMIU 2 in clock cycle 0 (reference numeral 44). Accordingly, data will be returned in clock cycles 70 to 73 (only clock cycles 70 and 71 are shown in FIG. 3, with data labeled D20 and D21). The memory controller 16 then has a read access that is mapped to MMIU 1. Because the memory latency is 60 clocks for MMIU1, and the data is returning for the read scheduled to MMIU2 beginning at clock 70, the read access can be scheduled immediately (clock cycle 1, reference numeral 46). The corresponding data returns in clock cycles 61 to 64, labeled D10 to D13 in FIG. 3. Accordingly, the lower latency data is actually transferred before the higher latency data, and performance may be more optimal in this case (as compared to the example of FIG. 2). Power is still optimized in this example as well. In some embodiments, if there is a synchronous relationship between the memory controller clock, the clock for the MMIU 24A memory modules, and the clock for the MMIU 24B memory modules, the memory scheduler 18 may schedule commands based on the highest frequency clock of the MMIU clocks and allow additional clock cycles for the lower frequency clock. For example, if MMIU 24A operates its memory modules at DDR3-1333 or a clock frequency of 667 Mhz and MMIU 24B operates its memory modules at DDR3-1066 or a clock frequency of 533 Mhz, then the memory controller 16 may use 667 Mhz clock to schedule the memory requests to both MMIUs but may provide 4 clocks separation (minimum) for requests to MMIU 24A memory modules and may provide 5 such clocks separation (minimum) for requests to MMIU 24B to account for the difference in clock frequency.

Returning to FIG. 1, the MMIUs 24A-24B are illustrated as having other configuration registers 30C and 30F. These registers may generally represent any other configuration parameters that may be supported in various embodiments of the MMIUs 24A-24C. It is noted that any of the registers 30A-30F may be implemented as two or more registers in various embodiments.

The links between the MMIUs 24A-24C and the memory controller 16 may implement any communication mechanism. For example, the links may be compatible with the FBDIMM interface. Alternatively, the links may implement a custom interface defined for communication by the designer specifically for communication between the memory controller 16 and the MMIUs 24A-24C. While unidirectional, point to point links are used in the illustrated embodiment, other embodiments may implement any other desired links. In some embodiments, there may be more than one interface per memory controller 16. Each interface would couple to a cascade of two or more MMIUs.

The processor cores 14A-14B may generally comprise circuitry configured to execute instructions defined in an instruction set architecture implemented by the processor 12. For example, in one embodiment, the processor cores 14A-14B may implement the SPARC instruction set architecture. Other embodiments may implement other instruction set architectures (e.g. PowerPC, x86 (or IA-32), IA-64, MIPS, ARM, etc.).

The processor cores 14A-14B may employ any construction, including scalar, superscalar, pipelined, superpipelined, in-order, out-of-order, and/or combinations thereof. In some embodiments, the processor cores 14A-14B may be multithreaded cores. Multithreaded cores have hardware support for executing multiple active threads simultaneously. That is, instructions from different threads may be executed without requiring a context switch. For example, the processor cores 14A-14B may support multiple copies of the general register set, one for each active thread. Other embodiments may implement single threaded processor cores 14A-14B.

While the illustrated embodiment includes the memory controller 16 integrated with the processor cores 14A-14B, other embodiments may implement the memory controller 16 separately. Still other embodiments may implement the memory controller 16 integrated with other components (e.g. an I/O bridge such at the north bridge used to bridge from a processor interface to an I/O interface such as Peripheral Component Interconnect (PCI)). In still other embodiments, the memory controller 16 may be integrated with the MMIUs 24A-24C and/or the processor cores 14A-14B.

As mentioned previously, by programming the MMIUs 24A-24C with different frequencies, the address space accessible to the memory controller 16 may be partitioned into multiple power zones. For example, in an embodiment that implements two MMIUs 24A-24B, two power zones may be created, as illustrated in FIG. 4. The high power zone may, for example, encompass the address range assigned to MMIU1 24A (reference numeral 50) and the low power zone may encompass the address range assigned to MMIU2 24B (reference numeral 52). The zones illustrated in FIG. 4 presume that MMIU1 24A is programmed to operate its memory modules at a higher frequency than the MMIU2 24B. The zones may be the opposite if the MMIU1 24A is programmed to operate at a lower frequency than the MMIU2 24B.

If more then two MMIUs are included in a system, then additional power zones may be defined. For example, in FIG. 5, high power zone 54, medium power zone 56, and low power zone 58 may be defined corresponding to MMIU1 24A, MMIU2 24B, and MMIU 24C address ranges, respectively. Each MMIU 24A-24C may be programmed to a different frequency to provide the zones illustrated in FIG. 5. Alternatively, a subset of the MMIUs 24A-24C may be programmed to the same frequency while another subset of the MMIUs 24A-24C may be programmed to a different frequency to provide different sized power zones.

Having established the power zones in the memory system, the operating system or other controlling software may be designed to assign threads to zones in order to more efficiently use power in the memory system. For example, FIG. 6 is a flowchart illustrating operation of one embodiment of an operating system during the launch of a thread for execution in the system. That is, FIG. 6 may illustrate operation performed when the thread is loaded from disk or other nonvolatile storage into the memory system for execution. The operating system may comprise instructions which, when executed, implement the operation illustrated in FIG. 6.

The operating system may determine one or more power characteristics of the thread and/or the current operating environment of the system 10 (block 60). The characteristics may be stored in a database or file that the operating system has access to, may be part of the data stored with the thread on disk, or may be available on a network to which the system 10 has access, for example. The power characteristics may be user assigned, or may be based on the performance needs of the application. For example, some threads may not present as large of a load on the memory system and so may not require high performance (high power) memory access. Some threads may be considered lower priority then other threads and may be assigned to a lower power zone if higher priority threads are executing. Additionally, the current operating environment may affect the determination. For example, if the system is in a low power mode, the thread may be assigned to a lower power zone then it might otherwise be assigned to. If there are too many threads assigned to one power zone, creating too much intra-thread contention for pages in the zone, the thread might be assigned to another power zone.

Responsive to the characteristics determined above, the thread may be assigned to the appropriate power zone (block 62). In some embodiments, the operating system may maintain a thread-specific data structure for each thread. The operating system may store an indication of the assigned power zone in the data structure (block 64). In other embodiments, the operating system may store a thread identifier in a data structure that identifies threads and their assigned power zones, or may associate the thread and the power zone in some other fashion.

Similar categorization of the thread and assignment into a power zone may be performed at times other than the launch of the thread, in various embodiments, as desired. For example, if a thread is reprioritized higher or lower, its power zone assignment may be changed. If the current operating environment changes, the power zone assignments may be changed.

Figure 7:
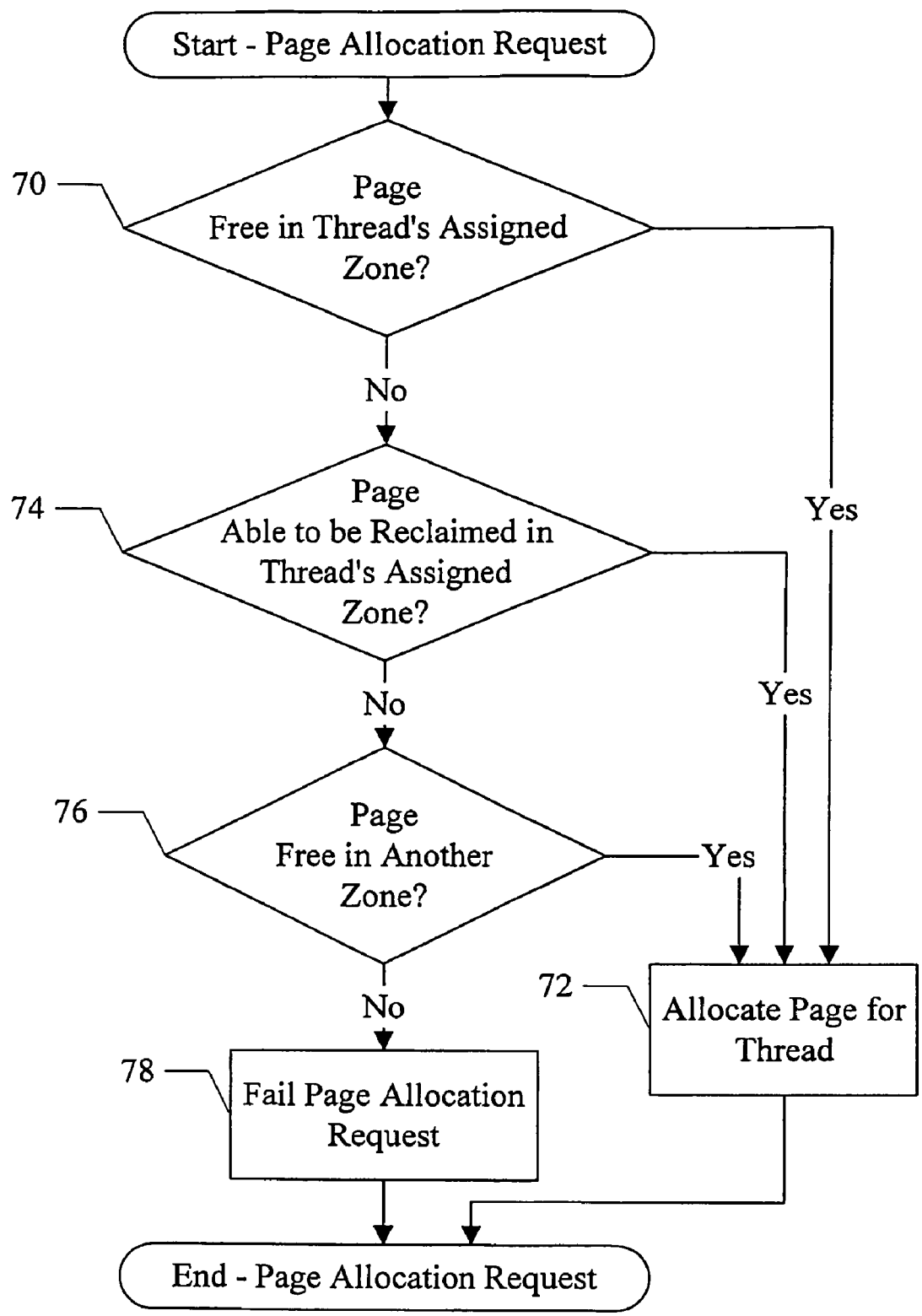
FIG. 7 is a flowchart illustrating operation of one embodiment of an operating system in response to a thread request.

Turning now to FIG. 7, a flowchart is shown illustrating operation of one embodiment of the operating system in response to receiving a page allocation request. Generally, the threads may be executed with address translation enabled. Accordingly, the page allocation request may occur in response to a page fault while the thread is executing. The operating system may comprise instructions which, when executed, implement the operation illustrated in FIG. 7.

The operating system may attempt to allocate a free page in the power zone to which the thread is assigned (decision block 70). If a free page in the assigned zone is available (decision block 70, yes leg), the operating system allocates that page (block 72). If no free page is available in the assigned zone, (decision block 70, no leg), the operating system may attempt to reclaim a page in the assigned zone (decision block 74). Generally, reclaiming a page may include invalidating an established translation from a virtual address to the page (possibly paging out the data in the page if the page was written to by the thread using the established translation) and reallocating the page to the requesting thread. There are numerous mechanisms for selecting a page to reclaim. For example, translation tables often include bits that indicate if the page has been accessed and if it has been modified. By periodically checking these bits (and clearing the accessed bits), the operating system can track which pages have been recently been accessed and/or modified. A page that is clean and not recently accessed, or a modified page that has not been recently accessed if all clean pages have been accessed, may be a candidate to be reclaimed. A page may also be a candidate for reclaim, in some embodiments, if it is allocated to a thread that is assigned to a different power zone. If a page can be reclaimed (decision block 74, "yes" leg), the operating system may reclaim the page and allocate the page to the thread (block 72). More particularly, in this embodiment, the page may be reclaimed even if there are free pages in other zones than the assigned zone. If there is no free or reclaimable page, the operating system may attempt to allocate a free page from another zone (decision block 76). If there is a free page (decision block 76, "yes" leg), the operating system may allocate the page to the thread (block 72). If there is no free page, the operating system may fail the allocation request (block 78).

There are many possible variations on the above scheme. For example, if there is no free page at another power level, the operating system may attempt to reclaim a page at another power level before failing the request. The order of reclaiming a page and checking for a free page at another power level (decision blocks 74 and 76) may be reversed. As yet another example, the operating system may only check for pages at lower power levels than the power level to which the thread is assigned.

It is noted that the present description periodically refers to various hardware, the MMIUs, the memory controller, etc. as being "configured to" implement various features. Generally, such language refers to a broad recitation of structure. The phrase "configured to" in such contexts should be interpreted as "having circuitry" that implements the recited features.

Turning next to FIG. 8, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media may include microelectromechanical systems (MEMS), as well as storage media accessible via a communication medium such as a network and/or a wireless link. The computer accessible storage medium 200 in FIG. 8 may store an operating system 100, which may be an embodiment of the operating system described herein. That is, the operating system 100 may implement, e.g., the flowcharts of FIGS. 6 and 7. Generally, the computer accessible storage medium 200 may store any set of instructions which, when executed, implement a portion or all of the flowcharts shown in FIGS. 6 and 7. A carrier medium may include computer accessible storage media as well as transmission media such as wired or wireless transmission.

Figure 9:
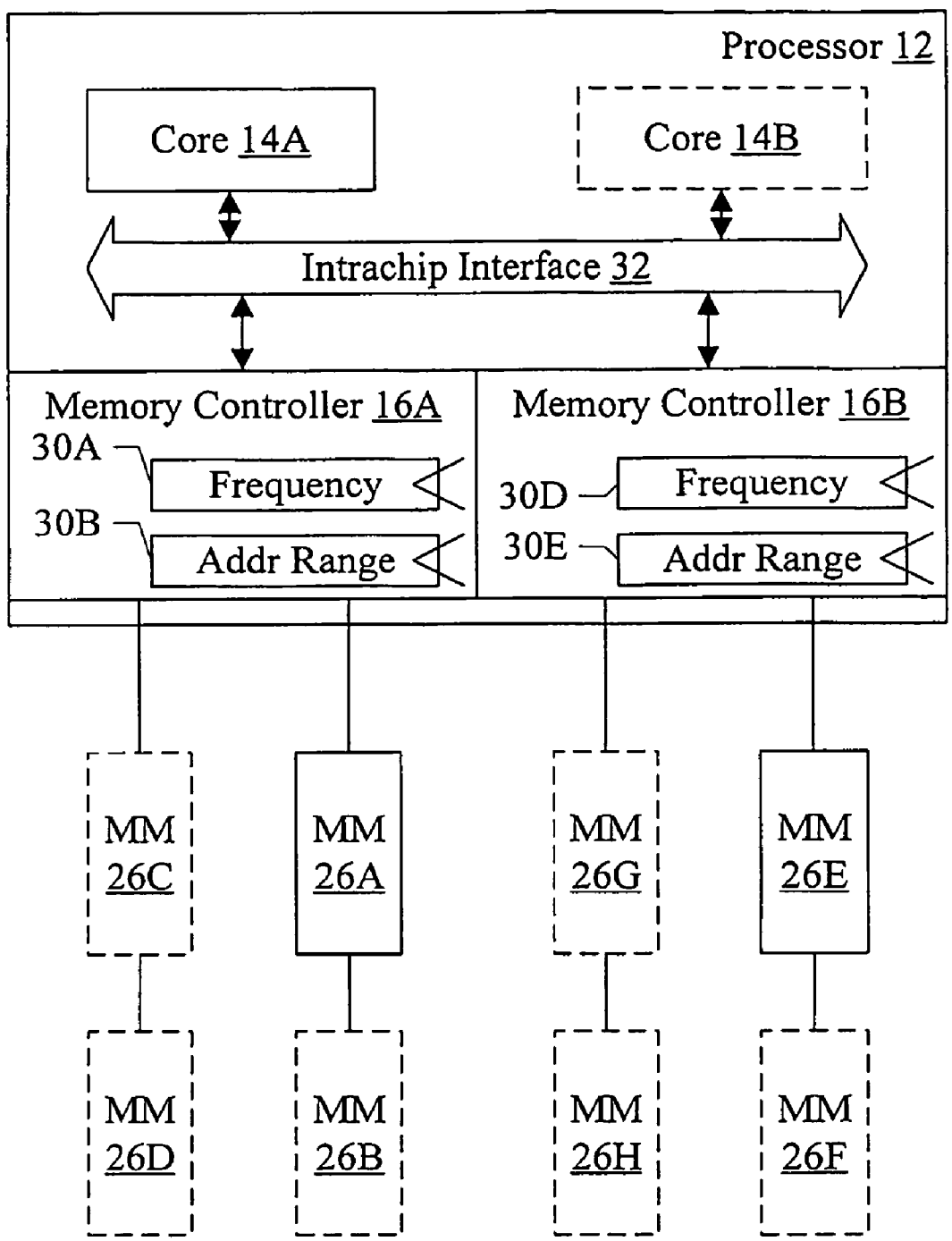
FIG. 9 is a block diagram of another embodiment of the system.

While the above embodiments implement different clock frequencies for memory modules coupled to different MMIUs in a cascade configuration, other embodiments are contemplated. For example, FIG. 9 illustrates another embodiment of the system 10. The embodiment of FIG. 9 includes a processor 12 and cores 14A and 14B, similar to the embodiment of FIG. 1. Additionally, the processor 12 of FIG. 9 includes a plurality of memory controllers such as memory controllers 16A-16B. There may be more than two memory controllers in other embodiments. Each memory controller 16A-16B includes is coupled to at least one memory module interface to at least one memory module, and optionally more than one memory module. For example, the memory controller 16A is coupled to the memory module 26A (and optionally the memory module 26B) via a memory module interface, and may optionally be coupled to the memory module 26C (and optionally the memory module 26D) via another memory module interface. Similarly, the memory controller 16B is coupled to the memory module 26E (and optionally the memory module 26F) via a memory module interface, and may optionally be coupled to the memory module 26G (and optionally the memory module 26H) via another memory module interface.

In the embodiment of FIG. 9, the memory controllers 16A-16B may each be programmable to operate their memory modules at different frequencies. For example, the memory controllers 16A-16B are illustrated as including the frequency registers 30A and 30D, similar to the MMIUs 24A-24B in FIG. 1. Other mechanisms for programming the memory controllers 16A-16B (e.g. pins or signals) may be used. The memory controllers 16A-16B may also be programmable with the address ranges that are mapped to that attached memory modules (e.g. registers 30B and 30E), and may include other configuration registers (not shown in FIG. 9).

Since there are multiple memory controllers in the illustrated embodiment, an intrachip interface 32 may be included in the processor 12 for routing the requests to the correct memory controller. The intrachip interface 32 may be any desired interface (e.g. a bus, point to point links, a crossbar, etc.). The intrachip interface 32 may also be part of a memory hierarchy (e.g. an L2 cache to which the cores 14A-14B are coupled). Based on the address of a memory request, the request may be routed to the correct memory controller 16A-16B.

In the embodiment of FIG. 9, the memory controllers 16A-16B comprise memory module interface units. Thus, in general, a memory module interface unit may comprise any circuitry that directly controls one or more memory modules via a memory module interface.

Numerous variations and modifications will become apparent to those skilled in the art once the above disclosure is fully appreciated. It is intended that the following claims be interpreted to embrace all such variations and modifications.

What is claimed is:

1. A system comprising:
 a first memory module interface unit (MMIU) configured to couple to a first one or more memory modules;
 a second MMIU configured to couple to a second one or more memory modules; and
 a memory controller, wherein the memory controller and the first MMIU are coupled by a first link and the first MMIU and the second MMIU are coupled by a second link, and wherein the first link and the second link are part of a same interface and are operated at a same frequency, wherein the memory controller is configured to issue a memory access having an address mapped to either of the first one or more memory modules or the second one or more memory modules on the first link, wherein the first MMIU is configured to accept the memory access in response to the address being mapped to the first one or more memory modules, and wherein the first MMIU is configured to forward the memory access on the second link in response to the address not being mapped to the first one or more memory modules;

wherein the first MMIU is configured to operate the first one or more memory modules at a first frequency and the second MMIU is configured to concurrently operate the second one or more memory modules at a second operating frequency different from the first operating frequency.

2. The system as recited in claim 1 further comprising the first one or more memory modules and the second one or more memory modules, and wherein the first one or more memory modules and the second one or more memory modules are members of a same memory technology family, and wherein the first frequency and the second frequency are each frequencies supported by the memory technology family.

3. The system as recited in claim 1 further comprising the first one or more memory modules and the second one or more memory modules, and wherein the first one or more memory modules are memory of a first memory technology family, and wherein the first frequency is supported by the first memory technology family, and wherein the second one or more memory modules are members of a second memory technology family different from the first memory technology family, and wherein the second frequency is supported by the second memory technology family.

4. The system as recited in claim 1 wherein the memory controller further comprises a memory scheduler configured to schedule memory accesses to the first MMIU and the second MMIU on the first link, wherein the memory scheduler is configured to schedule the memory accesses responsive to at least one of the first operating frequency and the second operating frequency.

5. The system as recited in claim 4 wherein the memory scheduler is configured to schedule the memory accesses based on a fixed latency corresponding to a lower one of the first operating frequency and the second operating frequency.

6. The system as recited in claim 4 wherein the memory scheduler is configured to schedule the memory accesses based on a variable latency dependent on the first operating frequency and the second operating frequency.

7. A non-transitory computer accessible storage medium storing a plurality of instructions which, when executed on a computer system that includes a memory system having an address space partitioned into at least two zones, each zone mapped to one or more memory modules, wherein each zone has a power characteristic indicating the power consumption of the memory modules within the zone during use, and at least one of the zones has a different power characteristic than another one of the zones during use:
   determine one or more characteristics of a thread that is being launched for execution in the computer system;
   assign the thread to one of the zones based on the one or more characteristics of the thread and the power characteristics of the zones;
   receive a page allocation request for a page to be used by the thread;
   allocate a free page in the zone to which the thread is assigned in response to a free page being available;
   reclaim a page in the zone to which the thread is assigned to be allocated to the thread, if there is no free page available and there is a reclaimable page available; and
   allocate a free page in another zone to the thread if there no free page in the zone and no reclaimable page in the zone.

8. The computer accessible storage medium as recited in claim 7 wherein the reclaiming is performed even if there are one or more free pages in another zone.

9. The computer accessible storage medium as recited in claim 7 wherein each of the zone has a performance characteristic that is dependent on the power characteristic, and wherein the assigning is further responsive to the performance characteristic.

10. A method implemented on a computer system that includes a memory system having an address space partitioned into at least two zones, each zone mapped to one or more memory modules, wherein each zone has a power characteristic indicating the power consumption of the memory modules within the zone during use, and at least one of the zones has a different power characteristic than another one of the zones during use, the method comprising:
   determining one or more characteristics of a thread that is being launched for execution in the computer system;
   assigning the thread to one of the zones based on the one or more characteristics of the thread and the power characteristics of the zones;
   receiving a page allocation request for a page to be used by the thread;
   allocating a free page in the zone to which the thread is assigned in response to a free page being available;
   reclaiming a page in the zone to which the thread is assigned to be allocated to the thread, if there is no free page available and there is a reclaimable page available; and
   allocating a free page in another zone to the thread if there no free page in the zone and no reclaimable page in the zone.

11. The method as recited in claim 10 wherein the reclaiming is performed even if there are one or more free pages in said another zone.

12. The method as recited in claim 10 wherein each of the zone has a performance characteristic that is dependent on the power characteristic, and wherein the assigning is further responsive to the performance characteristic.

* * * * *